J. FLECKENSTEIN.
MEASURING APPARATUS.
APPLICATION FILED JUNE 9, 1917.
1,405,826.
Patented Feb. 7, 1922.
3 SHEETS—SHEET 2.
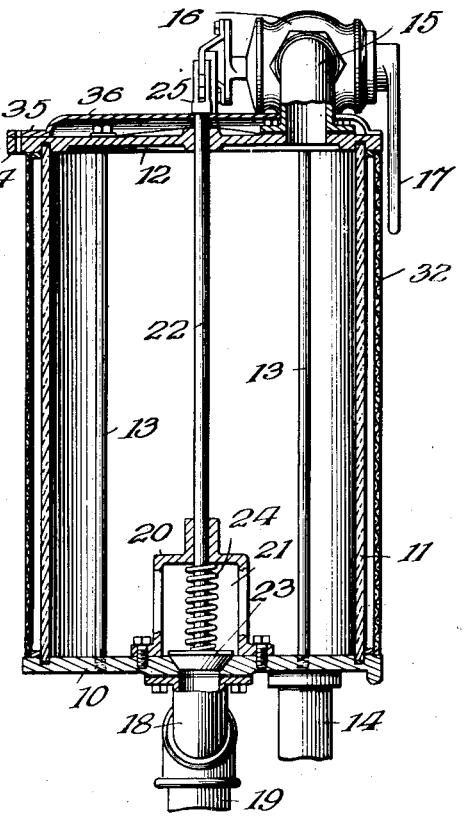
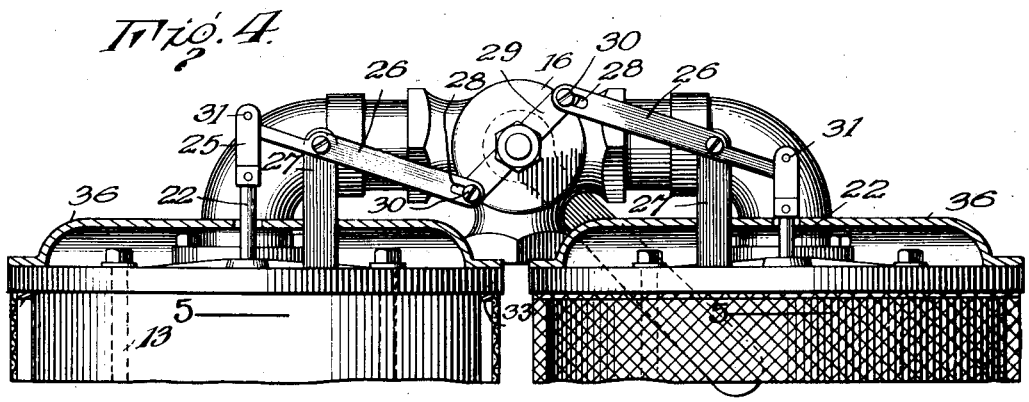
Jackson Fleckenstein
Inventor
By Edgar M. Kitchin
Attorney.

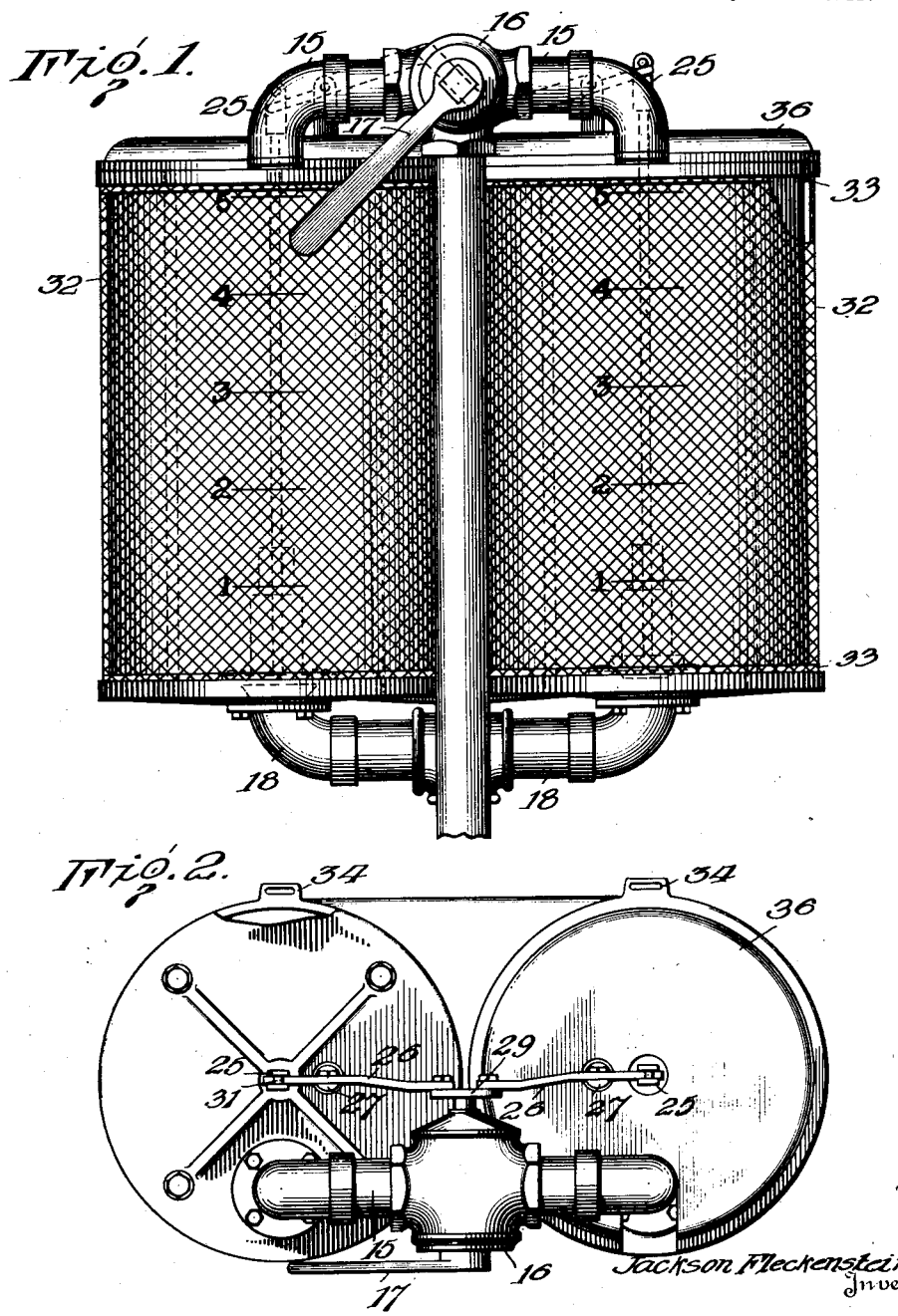

J. FLECKENSTEIN.
MEASURING APPARATUS.
APPLICATION FILED JUNE 9, 1917.
1,405,826.
Patented Feb. 7, 1922.
3 SHEETS—SHEET 3.
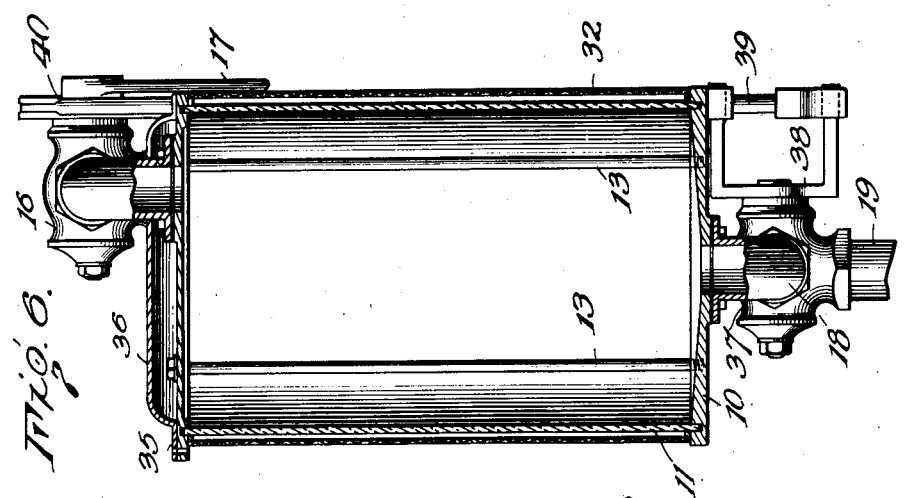
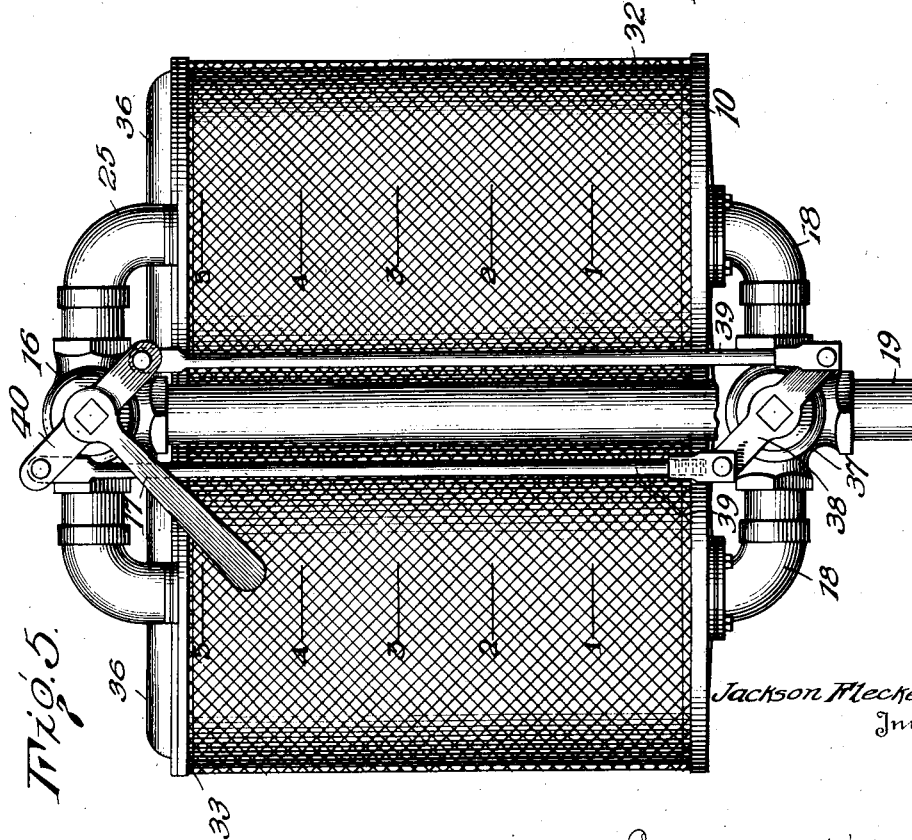

UNITED STATES PATENT OFFICE.

JACKSON FLECKENSTEIN, OF IONIA, MICHIGAN; ADELAIDE FLECKENSTEIN, GUARDIAN OF SAID JACKSON FLECKENSTEIN, A MINOR, ASSIGNOR TO FLECKENSTEIN VISIBLE GASOMETER COMPANY, OF CHICAGO, ILLINOIS, A CORPORATION OF DELAWARE.

MEASURING APPARATUS.

1,405,826.   Specification of Letters Patent.   Patented Feb. 7, 1922.

Application filed June 9, 1917. Serial No. 173,806.

*To all whom it may concern:*

Be it known that I, JACKSON FLECKENSTEIN, a citizen of the United States, residing at Ionia, in the county of Ionia and State of Michigan, have invented certain new and useful Improvements in Measuring Apparatus; and I do hereby declare the following to be a full, clear, and exact description of the invention, such as will enable others skilled in the art to which it appertains to make and use the same.

The present invention relates to measuring apparatus, and more particularly to that type adapted for use in dispensing gasoline and other liquids.

An object is to provide a liquid dispensing apparatus which also measures various desired quantities of the liquid as the latter is discharged, the measuring feature embodying a visual gage by means of which the purchaser may observe from a distance the quantity of the liquid dispensed.

The invention further aims at the provision of means in apparatus of this character for effecting a continuous flow of the liquid from the apparatus while being measured, and certain hereinafter specified improvements in the general construction and arrangement of parts to produce an efficient and practical apparatus.

The above, and various other objects and advantages of this invention will be in part described, and in part understood, from the following detailed description of the present preferred embodiment, the same being illustrated in the accompanying drawings, wherein,—

Figure 1 is a side elevation of a measuring apparatus constructed according to the present invention.

Figure 2 is a top plan view of the same.

Figure 3 is a vertical section taken transversely through one of the containers and the adjacent parts of the apparatus.

Figure 4 is a detail rear side elevation of the mechanism for connecting the valves.

Figure 5 is a front elevation of a measuring apparatus embodying a modified form of valve connecting mechanism.

Figure 6 is a vertical section taken through one side of the apparatus of Fig. 5.

Referring to these drawings, wherein like parts are designated by similar characters of reference throughout the several views, 10 designates a base or support in the form of an elongated plate or casting providing a pair of lower heads adapted to receive the lower ends of cylinders or containers 11 thereagainst. The cylinders 11 are preferably of transparent material to admit inspection of the contents thereof, but may be formed of any suitable material and provided with a gage glass, or the like, arranged to show the height of the material in the container. The upper ends of the cylinders 11 are closed by a pair of independent heads 12 secured to the cylinders by stay bolts 13 which are preferably arranged within the cylinders and have their lower ends screwthreaded to engage in correspondingly threaded openings in the base plate 10. The cylinders 11 may be provided with vertical rows of graduations indicating predetermined units of the capacity of the cylinders. As shown, each cylinder 11 is adapted to contain five gallons of liquid, and the scale of graduation is divided into one gallon indications on each cylinder.

A liquid supply pipe 14 rises through the base plate 10, preferably between the cylinders 11, and is connected at its upper end to a common feed pipe 15 having a branch for each cylinder or container and opening through the head 12 thereof. A valve 16 connects the supply pipe 14 to the branches of the feed pipe 15 and has the ports thereof so arranged as to alternately communicate the opposed branches of the pipe 15 with the pipe 14. The valve 16 is provided with a handle 17 which is arranged in front of the cylinders 11, as shown, and which may be readily grasped by the hand for manually controlling the valve 16.

A common discharge pipe 18 has the branches thereof connected to the under side, and opposite ends of the base plate 10 beneath the respective cylinders 11, the branches of the discharge pipe 18 opening upwardly through the base plate into the cylinders, preferably centrally of the same. A dispensing pipe 19 is connected to the discharge pipe 18 and may be provided with any suitable means for carrying off liquid from the containers.

Arranged within each container 11 is a discharge valve, the same comprising a cage or housing 20 secured to the adjacent end of the base plate 10 over the open end of the discharge pipe 18, rising from the base plate, and having openings 21 in its sides communicating the interior of the housing with the interior of the container. A valve rod 22 is arranged axially in each container 11, and has its lower end slidably passing through the top of the adjacent housing 20. A valve head 23, in the form of a disk, is carried upon the lower extremity of each rod 22 and is held yieldingly against the base plate 10 over the adjacent port by a spring 24 which encircles each rod 22 between its valve head 23 and the top of the adjacent housing 20.

The upper ends of the rods 22 have slidable bearing in the heads 12 and are provided upon their upper ends with forks 25. Each fork 25 receives between the arms thereof one end of a rocking lever 26, the latter being pivotally mounted upon the upper end of a post 27 rising from the adjacent head 12. Each rod 22 is provided with a rocking lever 26, and the free ends of said levers extend in a general direction toward each other and are provided with longitudinal slots 28 at their inner free ends. The movable member of the valve 16 is provided with a cross arm 29 upon its rear end exteriorly of the casing of the valve, the arm 29 being provided at opposite ends with headed pins 30, in the form of machine screws, which engage through the slots 28 to pivotally connect the inner ends of the levers 26 to the movable part of the valve 16. The outer ends of the levers 26 are held from rising out of the forks 25 by pins 31 which are secured transversely across the upper open ends of the forks. The forks are preferably of such length as to provide a free limited play of the levers 26 without actuating the valve rod 22, to insure the seating of the discharge valves 23. The pins 30 on the arm 29 are so positioned relatively to the ports in the movable member of the valve 16 that when the valve 16 is adjusted for establishing communication between the supply pipe 14 and one of the cylinders 11, the discharge valve 23 of the opposite cylinder will be held from its seat.

In order to protect the cylinders 11 a cage 32 may be employed, the same preferably being formed of a wire meshing of large gage formed into a cylindrical jacket adapted to fit around the cylinder between the heads 10 and 12 thereof, and be retained in place by the heads. Packing gaskets 33, of rubber or the like, are arranged against the opposite ends of the jacket 32 and are adapted to bind against the inner opposite faces of the heads 10 and 12 to retain the jacket in position and against vibration. The jackets may be moved from the cylinders by sliding the jackets upwardly therefrom when the upper heads 12 are removed. The gaskets 33 prevent injury to the exterior surfaces of the cylinders during the removal and positioning of the jackets.

Each head 12 is provided, at preferably its rear edge, with an outstanding apertured lug 34 adapted to register with a correspondingly apertured lug 35 formed upon the rear edge of a sealing or cover plate 36 adapted to fit over the top of the cylinder to enclose the upper ends of the tie-rods 13 and prevent separation of the heads from the cylinder without first removing the covering or sealing plate 36. As shown to advantage in Fig. 2, the plates 36 are provided with apertures for the reception of the valve rods 22, the posts 27, and the intake pipe 15. A sealing wire or the like, is adapted to be placed through the apertures in the lugs 34 and 35 when the same are brought into register.

From the above description, the operation will be apparent, for when the handle 17 is swung into the position shown in Fig. 1, the valve 16 will communicate the supply pipe 14 with the cylinder 11 on the left, the handle 17 being preferably arranged to swing to the left in this instance to serve as an indication of the cylinder being filled. The lever 26 of the left cylinder will be raised at its inner end by its pin 30, and the spring 24 is free to hold the valve 23 to its seat and thus prevent the outflow of fluid from the bottom of the cylinder. The loose connection between the valve stem 22 and the lever 26 admits of the seating of the valve 23 by the spring 24 and takes up wear upon the valve.

When the valve 16 is in this position the opposite lever 26 is depressed at its inner end and the opposite valve rod 22 is raised against the tension of the adjacent spring 24, and holds the discharge valve 23 open to dispense the liquid contained in the right cylinder 11. The liquid passes downwardly through the adjacent branch of the discharge pipe 18 and out through the pipe 19. As the fluid flows downwardly from the right hand container the surface level thereof may be observed by the purchaser and he may therefore definitely determine the amount of liquid which he receives.

When the right hand container 11 is emptied, the handle 17 may be immediately swung over into an opposite position to open the discharge valve of the left hand cylinder, and at the same time, close the discharge valve of the empty cylinder and open the supply pipe thereto. Thus, while one cylinder is being emptied, the opposite cylinder is being refilled so that a continuous discharge of the fluid may be effected by merely swinging the handle 17 from side to side.

It is, of course, understood if it is desired to discharge the liquid contents of the device under considerable pressure, any suitable connection may be made with a compressed air pipe for ejecting the fluid from the cylinders.

In Figs. 5 and 6 of the drawings, there is disclosed a modified construction wherein the discharge pipe 18 is provided with a three-way valve 37 communicating with the opposite ends of the discharge 18 and also with the outlet pipe or nozzle 19. The stem of the valve 37 has upon its outer end a cross arm 38 pivotally connected at its outer ends to rods 39 which extend upwardly and have pivotal connection at their outer ends with a second cross arm 40 carried upon the stem of the intake valve 16. The stem of the intake valve 16 is also provided, upon its forward end, with the handle 17 as shown in the above disclosed form. The connecting rods 39 and their cross arms 38 and 40 actuate the valves 16 and 37 simultaneously to alternately fill and discharge the opposed independent containers or cylinders.

It is, of course, understood that various changes and modifications may be made in the details of construction without departing from the spirit of the invention, and being restricted only by the scope of the following claims.

What I claim is:—

1. In measuring apparatus, the combination of a plurality of containers, a single inlet valve controlling intake to the containers, a discharge valve for each container, and connections for the valves for causing the discharge valves to be alternately closed and the intake valve to be open only to the container having its discharge valve closed.

2. In measuring apparatus, the combination of two containers, an inlet valve connected to the containers for controlling the passage of liquid thereto, two discharge valves, one for each container, and a lever for each discharge valve, each lever being connected to its respective discharge valve and to said inlet valve for causing movement of the inlet valve to a position opening connection with either container to move the discharge valve thereof to a closed position.

3. In measuring apparatus, the combination of a pair of containers, a supply pipe communicating with the containers, a valve in the supply pipe controlling the flow of liquid therefrom to the containers one at a time, a discharge pipe connected to the containers, a valve arranged in each container and including a valve rod rising through the container, and levers pivotally connected to the valve rods and to said supply controlling valve for alternately raising and lowering the valve rods to control the discharge of fluid from the containers simultaneously with the shifting of the supply controlling valve.

4. In measuring apparatus, the combination of a base, containers mounted on the base, heads for the containers, an inlet pipe having branches communicating through said heads with the containers, a supply valve between the inlet pipe and the branches to control the passage of fluid to said containers one at a time, a discharge valve mounted on the base at the bottom of each container and including a valve rod extending upwardly therefrom, and connections between the upper ends of said valve rods and said supply valve for alternately closing the discharge valves of the containers as the latter are opened to the supply pipe.

5. In measuring apparatus, the combination of a plurality of cylinders, an inlet pipe communicating with the cylinders, a supply valve connected with the inlet pipe for admitting fluid to the cylinders one at a time, a valve housing mounted in the bottom of each cylinder, a valve mounted in each housing, a spring in each housing engaging the valve to normally seat the same, valve rods rising from said valves through the housings and the tops of the cylinders, a discharge pipe connected to the bottoms of said cylinders, levers pivoted on top of the cylinders and having connection at one end with the valve rods, and connections between said supply valve and the upper ends of said rods for reciprocating the latter upon the adjustment of the supply valve for opening the discharge valves of the cylinders as the latter are closed to the fluid supply and for closing the discharge valves of the cylinders as the latter are opened to the supply.

6. In measuring apparatus, the combination of a plurality of containers, an inlet pipe having a branch for each container and connected thereto, an inlet valve in the inlet pipe for admitting fluid to the containers one at a time, a discharge valve at the bottom of each container and including a valve stem, a lever pivotally mounted on each container and having one end connected to the stem of the adjacent discharge valve, a disk connected to the inlet valve to turn upon the adjustment of the latter, and pins carried by the disk and engaging the opposite ends of said levers to actuate the same and the discharge valves upon the movement of the inlet valve.

In testimony whereof I affix my signature in presence of two witnesses.

JACKSON FLECKENSTEIN.

Witnesses:
HENRY C. CLARK,
MAYME C. BUHLER.